United States Patent [19]

Devuyst et al.

[11] Patent Number: 4,615,873

[45] Date of Patent: Oct. 7, 1986

[54] TREATMENT OF CYANIDE-FERROCYANIDE EFFLUENTS

[75] Inventors: Eric A. P. Devuyst, Toronto; Branka Tandi, Millgrove; Bruce R. Conard, Oakville, all of Canada

[73] Assignee: Inco Limited, Toronto, Canada

[21] Appl. No.: 728,337

[22] Filed: Apr. 29, 1985

[30] Foreign Application Priority Data

May 28, 1984 [CA] Canada .................................. 455236

[51] Int. Cl.$^4$ ................................................ C02F 1/58
[52] U.S. Cl. .................................... 423/367; 210/721; 210/763; 210/904
[58] Field of Search ................ 423/367; 210/721, 726, 210/904, 763

[56] References Cited

U.S. PATENT DOCUMENTS 3,736,239  5/1973  George et al. ...................... 423/367
4,537,686  8/1985  Borbely et al. ..................... 210/904

FOREIGN PATENT DOCUMENTS 1165474  4/1984  Canada .

Primary Examiner—John Doll
Assistant Examiner—Wayne A. Langel
Attorney, Agent, or Firm—Francis J. Mulligan, Jr.; Raymond J. Kenny

[57] ABSTRACT

A process for treatment of cyanide-containing aqueous effluents in which ferrocyanide present is precipitated with a metal other than copper, preferably zinc either prior to or simultaneously with the treatment of the effluent with sulfur dioxide and air in the presence of soluble copper.

5 Claims, No Drawings

TREATMENT OF CYANIDE-FERROCYANIDE EFFLUENTS

The present invention is concerned with the treatment of cyanide-containing effluents and, in particular, with cyanide-containing effluents which also contain substantial amounts of ferrous iron complexed as ferrocyanide ion.

PROBLEM

In Canadian application Ser. No. 395,013 filed Jan. 27, 1982, now Canadian Pat. No. 1,165,474, there is disclosed a method for treatment of aqueous effluent solutions containing cyanide to reduce the cyanide content thereof. The process essentially comprises treating the effluent solution with sulfur dioxide or a sulfite and gaseous oxygen in the presence of dissolved copper to transform cyanide to cyanate or other non-cyanide species. This process does not transform cyanide complexed as ferrocyanide ion to a non-cyanide species. Rather, the ferrocyanide ion is precipitated as a solid with copper as a copper ferrocyanide compound. When the effluent to be treated by $SO_2$ and oxygen contains large amounts of ferrocyanide ion in solution and especially in such case where the effluent is treated continuously, precipitation of copper ferrocyanide may be the cause of insufficient copper in a reaction volume for catalysis of the cyanide-$SO_2$-oxygen reaction as contemplated in Canadian application Ser. No. 395,013.

OBJECTS

It is an object of the present invention to provide means in the process of Canadian application Ser. No. 395,013 to assure the presence of sufficient copper to catalyze the reaction of cyanide-$SO_2$-oxygen.

GENERAL DESCRIPTION OF THE INVENTION

The process of the present invention contemplates the preferential precipitation of ferrocyanide ion in solution as an insoluble zinc, nickel, cadmium, cobalt, lead, mercury, or silver ferrocyanide product along with copper ferrocyanide, if any, so as to maintain in the reaction medium contemplated in Canadian application Ser. No. 395,013 an amount of copper effective to catalyze the reaction among cyanide species (other than ferrocyanide), $SO_2$ and oxygen. We prefer to use nickel, manganese or zinc ion to precipitate ferrocyanide with the best results being obtained with zinc ion. The precipitation mentioned in the previous sentence is carried out by adding to the effluent an amount of the ion chemically equivalent to the amount of ferrocyanide ion in the effluent solution either prior to or simultaneous with the treatment of the effluent with $SO_2$ and oxygen in the presence of soluble copper.

Ferrocyanide can be increased or maximized in the effluent by adding ferrous ion in an amount up to 1/6 the molar quantity of free cyanide originally present in the effluent, and then ferrocyanide ion can be precipitated by addition of zinc ion or others mentioned above. The metal ion can be added prior to or simultaneously with the the $SO_2$-air treatment. It is important to note that in accordance with the present invention, all ferrocyanide in the effluent solution, whether initially present or artifically created by addition of ferrous ion, must be reacted and precipitated with metal ion. Otherwise, copper required as a catalyst for the reaction of $SO_2$, $O_2$ and cyanide will be removed by precipitation as copper ferrocyanide.

The $SO_2$-oxygen reaction is carried out as disclosed in Canadian application Ser. No. 395,013. Thus, free and complex cyanide species, other than ferrocyanides, present in waste water streams are decomposed by treating the waste water with a mixture of sulfur dioxide and air or oxygen in the presence of a water-soluble copper catalyst. The treatment is effective at any pH in the range of about 5 to about 12, but is preferably conducted ina pH range between about 5 and 11, e.g., around 9. Removal of the free cyanide and complex metal cyanide species from waste water streams is very slow with $SO_2$ and air alone. The presence of copper catalyzes the removal of free cyanide and complex heavy metal cyanide species from the stream. Once the cyanide species are removed, related species, e.g., thiocyanate, can be removed by continued treatment with sulfur dioxide and oxygen and air in the presence of a metal ion (simple or complex) such as nickel, cobalt, or manganese which then acts catalytically in the stream. The thiocyanate species is removed effectively using nickel as a catalyst with or without copper.

Control of pH is effected by any alkali or alkaline-earth metal hydroxide or carbonate. Limestone can be used in the pH range about 5 to about 6.5. Metals present in the effluents treated in accordance with the invention can be recovered as oxides or hydroxides by adjusting the pH of the treated waste water to the range of about 9 to about 10. In some instances, a lower pH can be used to produce these oxides or hydroxides. The metal species employed as catalyst can thus be recovered and recycled, if desired.

Alkali or alkaline-earth metal sulfites (including bisulfites, meta-bisulfites and pyrosulfites) can be employed in place of the sulfur dioxide-air or oxygen mixture.

The process can be carried out batchwise or continuously using one or several stages, depending on the objectives with respect to species to be decomposed and metals to be recovered.

The necessary reagent for cyanide wastewater treatment can be prepared, for example, by scrubbing a stack gas containing typically 0.1 to 5% $SO_2$, 1–5% $CO_2$ with lime or limestone as base to produce a suspension or slurry containing calcium sulfite or bisulfite. Alternatively, a stack gas, as before described, can be used as a primary reagent along with lime or limestone as a base. When using calcium sulfite or bisulfite, an operating pH of about 5 to about 7 is desirable, since at higher pH dissolution of calcium sulfite becomes too slow. It will be appreciated in this connection that the action of sulfur dioxide and oxygen in water solution during the practice of the process of this invention results in the production of sulfuric acid which must be neutralized resulting in calcium sulfate (gypsum) formation when lime or limestone is used as base to control pH. A low operating pH of 5 to 7 is preferred when using sparingly soluble sulfites such as calcium sulfite so as to reduce the amount of unreacted sulfite and calcium sulfate in the metal, including gold, silver and platinum-group metal precipitates. The required amount of sulfite can be added at once and the required air or oxygen addition can be added separately. In similar fashion (and bearing in mind the need for pH control), the required amount of sulfur dioxide can be added initially with the air or oxygen requirement added separately. At least about 2.5 grams of sulfur dioxide are required per gram of $CN^-$ to be removed; whereas at least about 4.5 grams of sulfur dioxide are required per gram of $CNS^-$ to be removed. The rate of oxygen supply to the solution sets the maximum for the reaction kinetics.

It is to be appreciated that the waste waters treated in accordance with the invention are indeed very dilute with respect to the species to be removed. Thus, with respect to the cyanide species the waters treated rarely contain more than about 1000 ppm total cyanide in solution and more ordinarily will contain no more than about 200 ppm total cyanide in solution. This total cyanide is, of course, reduced by precipitation of ferrocyanide. If the ferrocyanide of the effluent is maximized and precipitated, it is not impossible to produce effluents which contain of the order of 3 ppm of a soluble cyanide species prior to $SO_2$-oxygen treatment. This small amount of soluble cyanide can thus be rapidly reduced to below 0.1 ppm cyanide in solution by $SO_2$-oxygen treatment in the presence of a soluble copper catalyst to satisfy the most stringent of environmental standards.

In removal of free cyanide and cyano-metal complexes from waste waters after or while soluble ferrocyanide is precipitated with zinc or other metal ion in accordance with the present invention, preferred ingredients are sulfur dioxide, air and lime. The temperature may be in the range of 0° to 100° C. and the operating pH about 5 to about 10. Sulfur dioxide preferably is dispersed in the water to be treated as a mixture of 0.1 to 6% by volume in air. For this purpose, reactors used in flotation technology are entirely suitable either for adding $SO_2$-air mixtures or for adding air alone to water solutions or pulps containing sulfites or bisulfites. The process of the invention operates effectively at normal atmospheric pressure and this is the preferred mode of operation. If desired, however, higher pressure can be employed.

The catalyst for free cyanide and complex cyanide removal is copper which should be present preferably in a weight ratio of copper to total cyanide of at least about 0.25 gm/gm to obtain utilization of sulfur dioxide and air, together with high reaction kinetics. Thiosulfate ion can also be removed from the solution under these preferred conditions.

In the case of thiocyanate ion removal, the same reagents are preferred using a temperature in the range of about 25° C. to 100° C. and with a pH less than about 9. The $SO_2$ addition rate should be at least about 2 grams per liter per hour as a 0.1 to 1% volume proportion of sulfur dioxide in air. Again a metal catalyst, preferably nickel, should be present to provide high reaction kinetics.

The term "metal catalyst" refers to metal in solution. Essentially water-insoluble compounds such as copper hydroxide, per se, are not effective catalysts except insofar as they are soluble in cyanide solution and free cyanide is present to effect such dissolution.

In carrying out the process on a continuous manner, it is usually required that a volume of water be established which contains soluble cyanide at most at the discharge concentration level and copper as a solid in cyanide-soluble form. Experience has shown that the process of the present invention, at least in part, involves a reaction wherein cyanide is oxidized to the less harmful cyanate. This reaction is catalyzed by the presence of the soluble copper and proceeds most expeditiously when all reactable cyanide is complexed as copper, zinc or nickel complex cyanides.

As a method of initiating a continuous process in accordance with the present invention, we prefer to initially operate the process as a batch in whatever reaction vessel is available. When the batch is fully reacted, the soluble cyanide content is low e.g. below 1 ppm and copper hydroxide as a product is present in the reacted batch, continuous operation is started. If, for any reason, copper hydroxide or any cyanide-soluble solid copper compound (other than copper ferrocyanide) disappears from the reaction volume, the continuous process can be reestablished by introduction of such solid copper compound into the reaction volume and restarting as a batch, if necessary.

EXAMPLES

The examples discussed herein with respect to the present invention were carried out as continuous processes with a starting volume comprising water and metals in solution. Feed containing 200 mg/l total cyanide, 100 mg/l thiocyanate, 20 mg/l of copper and 20 mg/l of iron was treated in nine campaigns at 20° C. and a pH of 9 with a retention time of 20 minutes. In each campaign, sulfur dioxide in an amount of 3.5 g/g total cyanide as $Na_2S_2O_5$ was employed and lime was used to maintain pH. Air was used at a rate of 1 liter/min per liter of reaction volume. When metal was added, the designation "continuous" indicates continuous addition to the reaction volume along with feed and the designation "pre-added" indicates addition of the metal to the feed prior to the feed entering the reaction zone. The results of examples of the invention and comparative tests are set forth in the following Table.

TABLE

| CAMPAIGN | METAL ADDED (mg/l) | MODE OF ADDITION | EFFLUENT ASSAYS (mg/l) | | | | | |
|---|---|---|---|---|---|---|---|---|
| | | | CN(T) | SCN | Cu | Fe | Zn | Ni | Mn |
| 1 | — | — | 30 | — | <0.1 | 10.1 | — | — | — |
| 2 | 40 Zn | Continuous | 0.16 | 95 | <0.2 | <0.2 | 0.3 | — | — |
| 3 | 40 Zn | Pre-added | 0.71 | — | 0.2 | 0.3 | 0.5 | — | — |
| 4 | 40 Cu | Continuous | 10 | 91 | 0.1 | 3.5 | — | — | — |
| 5 | 40 Cu | Pre-added | 7.4 | 100 | <0.2 | 3.2 | — | — | — |
| 6 | 40 Mn | Continuous | 36 | 93 | <0.2 | 10.4 | — | — | 1.6 |
| 7 | 40 Ni | Continuous | 37 | 94 | 0.2 | <0.2 | — | 19 | — |
| 8 | 40 Ni | Pre-added | 54 | 100 | <0.2 | 3.4 | — | 29 | — |
| 9 | 40 Cd | Continuous | 0.2 | — | <0.1 | <0.1 | * | — | — |

*About 1.8 mg/l $Cd^{++}$ in effluent

The data in the foregoing Table shows that, of the metals tested, zinc and cadmium are the most efficacious in lowering the iron content of the feed solution and in lack of interference with, and perhaps enhancing reaction of, cyanide with $SO_2$ and oxygen. Each of the metals tested except manganese had a significant effect in lowering iron. However, the reaction between cyanide and $SO_2/O_2$ may have been effected by some metallic additions. No effort was made to maximize cyanide destruction in these reported tests.

We claim:

1. In a process for treating cyanide-containing solution with sulfur dioxide and oxygen in the presence of a soluble copper catalyst to reduce the cyanide content thereof, the improvement comprising precipitating ferrocyanide species in said solution by means of at least one precipitant selected from the group of ions consisting of zinc, nickel, cadmium, cobalt, lead, mercury and silver prior to or simultaneous with said treatment with sulfur dioxide and oxygen.

2. A process as in claim 1 wherein ferrocyanide is formed in said solution by addition of ferrous ion.

3. A process as in claim 1 wherein said precipitant is zinc ion.

4. A process as in claim 1 wherein said precipitant is nickel ion.

5. A process as in claim 1 wherein said precipitant is cadmium ion.

* * * * *